United States Patent [19]
Rockstedt

[11] Patent Number: 5,762,975
[45] Date of Patent: Jun. 9, 1998

[54] DIE HEAD FITTED TO THE OUTLET OF AN EXTRUDER

[75] Inventor: Siegward Rockstedt, Bad Nonenahr, Germany

[73] Assignee: Compex GmbH Compoundier-und Extrusionsanlagen, Germany

[21] Appl. No.: 718,516

[22] PCT Filed: Feb. 7, 1996

[86] PCT No.: PCT/EP96/00511

§ 371 Date: Dec. 23, 1996

§ 102(e) Date: Dec. 23, 1996

[87] PCT Pub. No.: WO96/24481

PCT Pub. Date: Aug. 15, 1996

[30] Foreign Application Priority Data

Feb. 8, 1995 [DE] Germany ............... 195 04 119.4

[51] Int. Cl.[6] .................................................... B29C 47/16
[52] U.S. Cl. ................... 425/186; 425/190; 425/192 R; 425/381; 425/464
[58] Field of Search ............... 425/72.2, 192 R, 425/378.2, 464, 381, 186, 192 S, 190

[56] References Cited

U.S. PATENT DOCUMENTS 3,543,557 12/1970 Lomas .
3,957,565 5/1976 Livingston et al. ............... 156/500
4,464,104 8/1984 Gneuss ............... 425/192 R
4,889,476 12/1989 Buehning ............... 425/72.2
5,078,586 1/1992 Holzschuh ............... 425/192 R
5,221,541 6/1993 Arbour et al. ............... 425/188
5,223,276 6/1993 Djordjevic et al. ............... 425/131.1
5,269,670 12/1993 Allen et al. ............... 425/72.2
5,388,977 2/1995 Shirakawa ............... 425/190
5,580,581 12/1996 Buehning ............... 425/7

FOREIGN PATENT DOCUMENTS 25 45 042 4/1977 Germany .
36 28 935 3/1988 Germany .

*Primary Examiner*—Jay H. Woo
*Assistant Examiner*—Iurie A. Schwartz
*Attorney, Agent, or Firm*—Banner & Witcoff, Ltd.

[57] ABSTRACT

A die assembly fitted to the outlet of an extruder includes a die head for discharging thermoplastics melted in the extruder. The die head (7) is mounted longitudinally displaceably, transversely with respect to the polymer flow, in a rail guide of an intermediate plate (4) arranged between outlet of the extruder and die head (7) and can be removed from the intermediate plate (4) by longitudinal displacing. The die head (7) is supported on the intermediate plate (4) by sealing surfaces (8, 11), against which the die head (7) can be pressed by a screw coupling (10), the loosening of which makes possible the longitudinal displaceability of the die head (7).

4 Claims, 4 Drawing Sheets

DIE HEAD FITTED TO THE OUTLET OF AN EXTRUDER

FIELD OF THE INVENTION

The invention relates to a die head fitted to the outlet of an extruder for discharging thermoplastics, having a manifold which is flowed through by the polymer melted in the extruder and delivers said polymer through a die plate on the outlet side of the die head.

BACKGROUND OF THE INVENTION

The die head has previously been fastened to the outlet of the extruder by screwing. For cleaning the die head, which is necessary both when it is soiled and when changing over to a different polymer material, the die head must then be unscrewed and, if applicable, replaced by an awaiting die head, which then for its part has to be screwed onto the outlet of the extruder. If the die head involved is particularly large and heavy, it has also already been the practice to use a hinge to fit it to the outlet of the extruder, from which the die head can be swung away for the purpose of cleaning the said arrangement. In this case, however, the rapid exchange of a soiled die head by an awaiting die head is not possible.

SUMMARY OF THE INVENTION

The invention is based on the object of designing the die head such that it can be removed in a simple way from the outlet of the extruder and, if applicable, be replaced by an awaiting die head. According to the invention, this takes place by providing that the die head is mounted longitudinally displaceably, transversely with respect to the polymer flow, in a rail guide of an intermediate plate arranged between outlet of the extruder and die head and can be removed from the intermediate plate by longitudinal displacing, the die head being supported on the intermediate plate by means of sealing surfaces, against which the die head can be pressed by a screw coupling, the loosening of which makes possible the longitudinal displaceability of the die head.

Mounting the die head in the rail guide opens up the possibility of initially making the outlet of the extruder accessible just by longitudinally displacing the die head, so that this area is exposed for cleaning. The removal of the die head from the outlet of the extruder is then performed by a longitudinal displacement into an area in which the die head can be removed, so that it can be easily cleaned away from the outlet of the extruder. An available clean die head can then be inserted into the rail guide immediately after removal of the possibly soiled die head and be brought into its normal position, in which the die head is flowed through by the melted polymer. Only a few manipulations are required for this exchanging of the die head, with the result that this operation can be carried out very quickly. Production is in this case interrupted only very briefly. There is no need here to unscrew the screw coupling, loosened in this case, entirely from the intermediate plate, since just a slackening of the screw coupling is necessary in order to displace the die head in the longitudinal direction and finally remove it from the intermediate plate.

A cavity is expediently formed in the intermediate plate for receiving the melted polymer in such a way that its cross section right up to the die head corresponds at least to the barrel bore of the extruder. In the case of this design, with the die head adequately displaced longitudinally or removed, the screw contained in the extruder can be readily drawn out of the barrel of the extruder since, because of the correspondingly large cross section of the cavity in the intermediate plate, the screw can readily be drawn out through said cavity.

To be able also to subject the die plate separately to cleaning, or to replace a die plate for another with a different arrangement of the holes, the die plate is expediently mounted in a further rail guide on the die head, with the result that the die plate can be removed from the die head by longitudinal displacing, the die plate being supported on the die head by means of sealing surfaces against which the die plate can be brought to bear by a screw coupling, the loosening of which permits the longitudinal displaceability of the die plate. In the case of this design, in a way similar to the supporting of the die head, a sealing with respect to the intermediate plate is obtained by means of sealing surfaces against which the die plate can be brought to bear by the screw coupling, with the result that the die plate can be removed from the die head in a simple way by the loosening of the screw coupling, without screwing it out. Before the removal of the die plate with die head and of the die plate alone, the removal of these components can be made possible easily and quickly by displacing them, with the result that only a very brief interruption in production is required when removing and exchanging the die plate.

Heating cartridges may be provided in the die head in order, if appropriate, to bring it to an increased temperature, with the result that the polymer material forced through can retain adequate viscosity.

The die head is frequently provided with a manifold, which directs the melted polymer from the outlet of the extruder to the interior of the die head. Such a manifold may be equipped, for example, with a filter, in order to filter out contaminants originating from the extruder. In the case of the use of such a manifold, it is expediently arranged between die head and intermediate plate, the manifold being supported by its own sealing surfaces against the intermediate plate and the die head. The sealing in the region of the manifold thus takes place in the same way as has been described above with respect to the direct sealing between die head and intermediate plate.

BRIEF DESCRIPTION OF THE DRAWINGS

An exemplary embodiment of the invention is represented in the figures, in which.

DETAILED DESCRIPTION OF THE PREFERRED EMBODIMENTS

Figure 1:
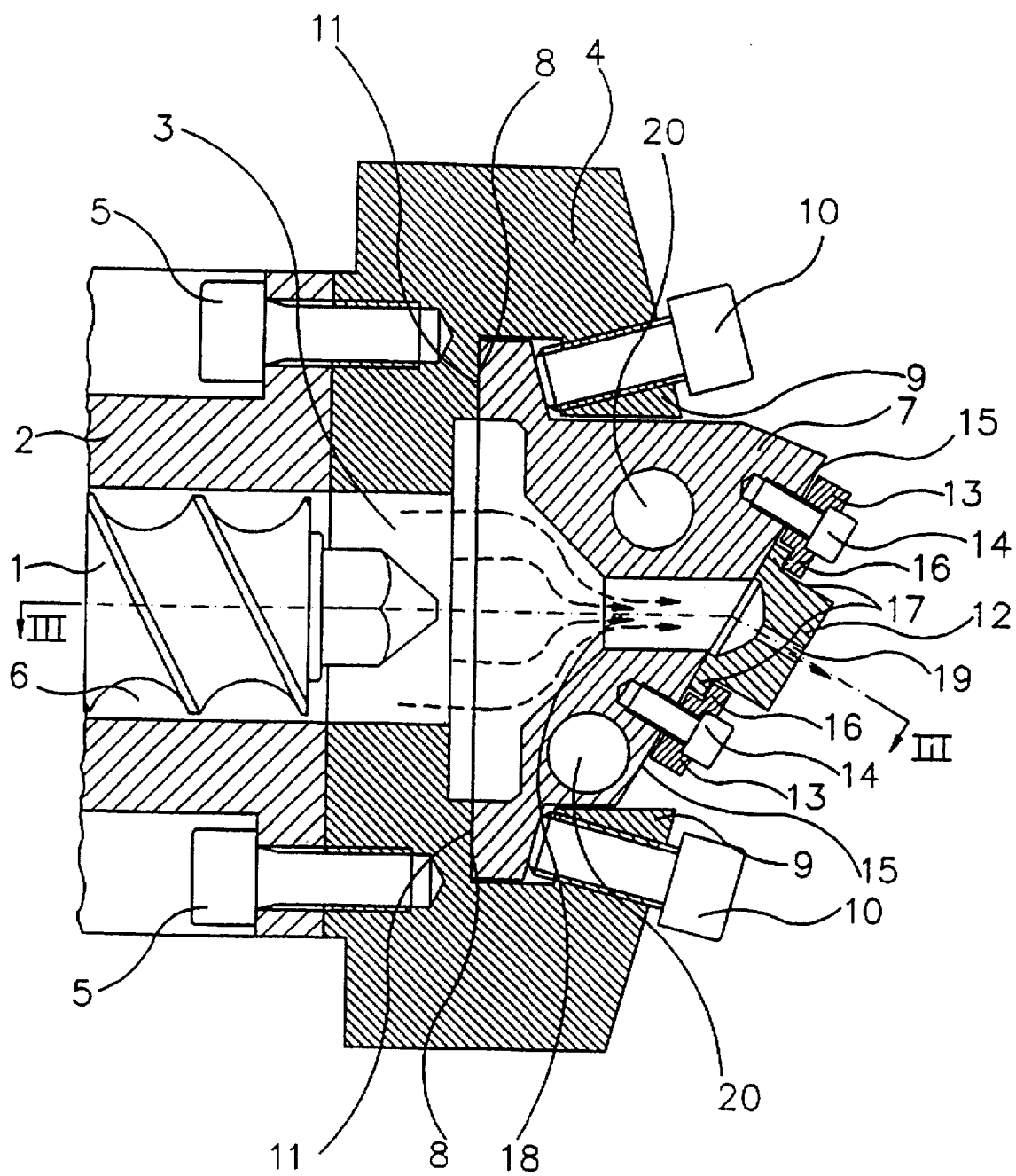
FIG. 1 shows a longitudinal section through the die head with die plate, fitted to the outlet of an extruder.

Represented in FIG. 1 is an extruder screw 1, which rotates in the extruder barrel 2. Polymer, not shown here, is conveyed by the extruder screw 1 to the outlet of the extruder screw 1, which is formed here by the cavity 3 in the intermediate plate 4, which is fastened to the extruder barrel 2 by means of the two screws 5. As can be seen here, the cavity 3 has the same dimensions as the bore 6 of the extruder barrel 2, with the result that, when the components fastened to the intermediate plate 4 are removed (which is discussed in more detail further below), the extruder screw 1 can be drawn out from the extruder barrel 2 through the cavity 3 without any problem. This is required in the first place for assembly, in the second place also for cleaning.

Fitted to the intermediate plate 4 is the die head 7, to be precise in a rail guide which is formed by the sealing surface 8 and the two mounts 9, which latter are integrally formed such that they protrude inwardly out of the intermediate plate 4. In this rail guide, the die head 7 is mounted longitudinally displaceably (that is to say perpendicularly with respect to the plane of the drawing). Its arrestment with respect to the intermediate plate 4 takes place by means of the two screws 10, on tightening which the die head 7 is pressed against the sealing surfaces 8 of the intermediate plate 4. To achieve reliable sealing in this case, the bearing surfaces of the die head 7 with respect to the sealing surfaces 8 are likewise designed as sealing surfaces 11. When the screws 10 are loosened, the die head 7 can, as stated, be displaced longitudinally into a position from which it can be removed from the intermediate plate 4, which is explained further with reference to FIG. 4.

Fitted to the die head 7 is the die plate 12, to be precise by means of the two retaining clamps 13, which are pressed by means of the screws 14 against the outer surface 15 of the die head 7 and at the same time act as a further rail guide with their projections 16, which engage over corresponding supports 17 on the die plate 12 and press them against the outer surface 15. To achieve sealing in this case as well, the outer surface 15 and the corresponding mating surface on the supports 17 are designed as sealing surfaces. By loosening the screws 14, the pressing of the supports 17 against the outer surface 15 is released, with the result that the die plate 12 can be displaced longitudinally (perpendicularly with respect to the plane of the drawing), until finally it reaches an area where it can be removed from the die head 7. In this respect, reference is made to the relevant explanations on the mobility and removal of the die head 7.

In the case of the arrangement represented in FIG. 1, melted polymer material flows from the extruder screw 1 into the cavity 3 and from there into the passage 18 in the die head 7, from where the polymer material emerges through the dies 19 as a strand of molten polymer material.

Provided in the die head 7 are bores 20, into which heating cartridges are inserted, which serve the purpose of keeping the polymer material flowing through at a desired temperature.

Figure 2:
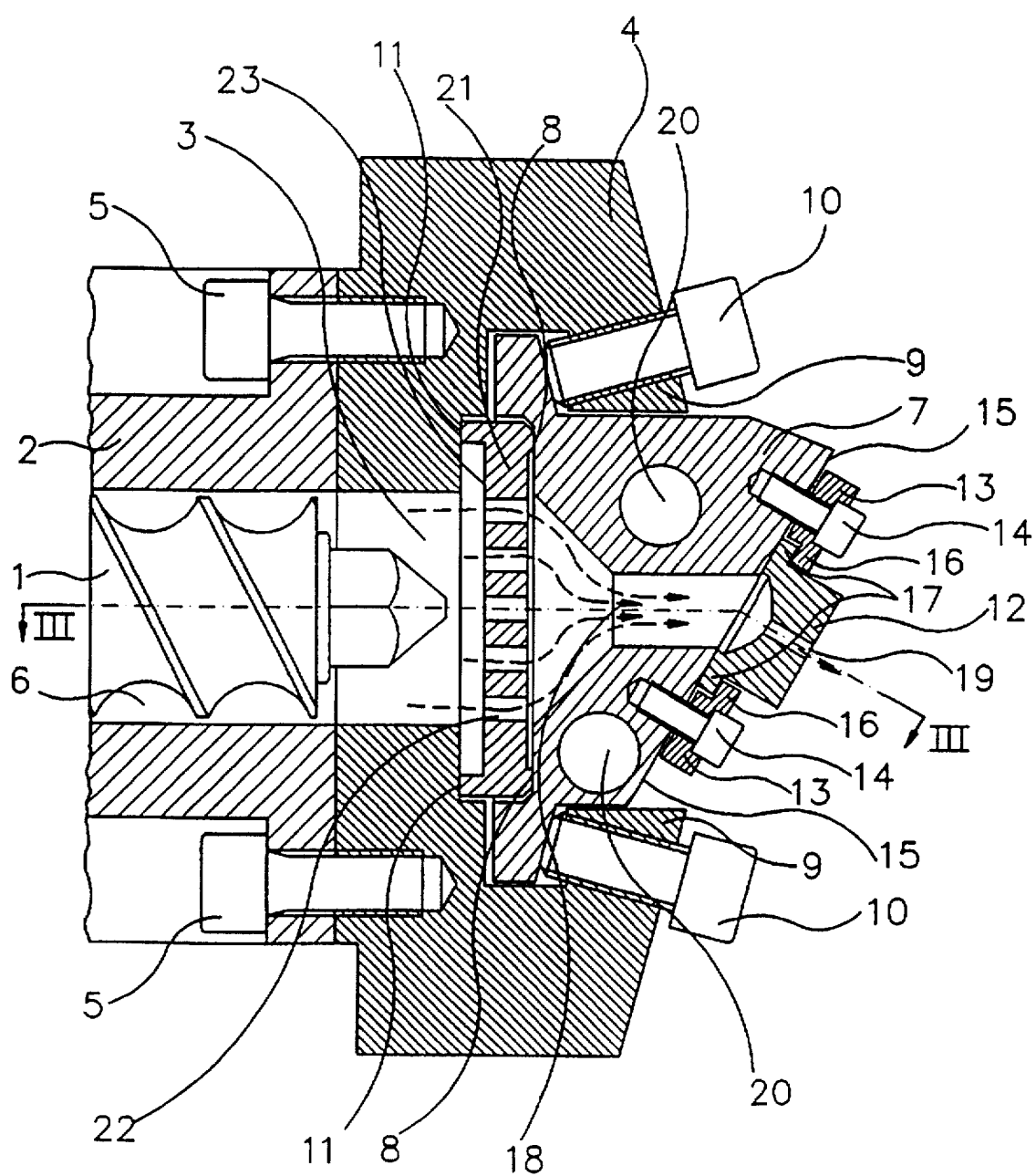
FIG. 2 shows the same arrangement additionally with a manifold.

In FIG. 2, the same arrangement as in FIG. 1 is shown, but supplemented by the manifold 21, which is arranged in a sealing manner between the intermediate plate 4 and the die head 7. The manifold is provided here with a plurality of passages 22, which are flowed through by the melted polymer. The manifold 21 serves the purpose of bearing, possibly on its inner surface 23, a filter (not shown) which can serve the purpose of filtering out contaminants from polymer material to be processed. The manifold 21 is provided both on its side facing the extruder 1 and on its side facing the die head 7 with sealing surfaces, which are supported against corresponding sealing surfaces on the intermediate plate 4 and on the die head 7. The sealing surfaces are pressed against one another when the screws 10 are tightened, for which purpose a small distance is to be maintained between the surfaces 8 and 11 in order to achieve reliable surface pressing. As far as function of the arrangement according to FIG. 2 is further concerned, reference is made to the relevant explanations for FIG. 1.

Figure 3:
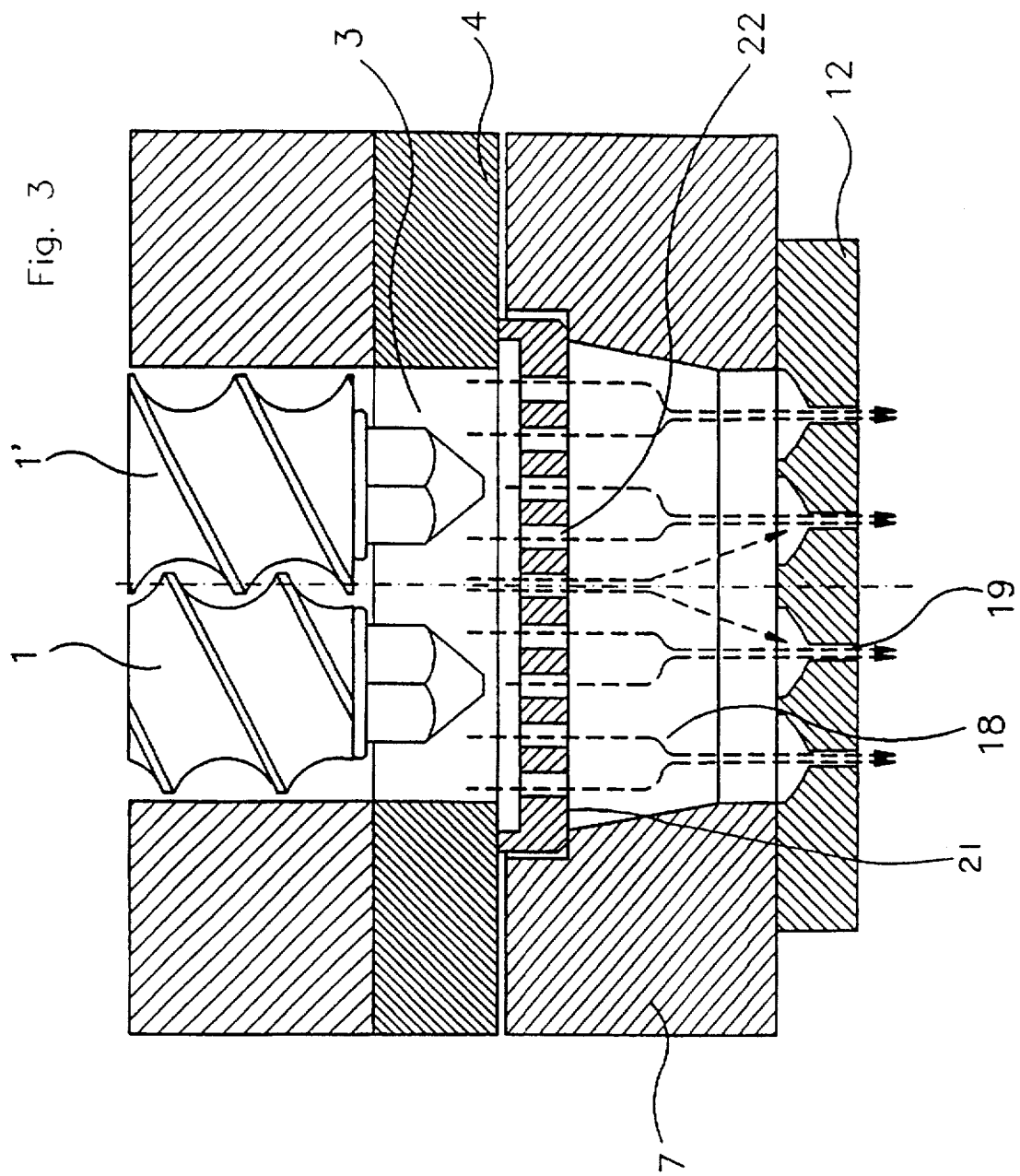
FIG. 3 shows a longitudinal section through the arrangement according to FIG. 1 along the line III—III from FIG. 2, to be precise in the closed position, i.e. with the die head not displaced.

Shown in FIG. 3 is a longitudinal section through the arrangement according to FIG. 2, to be precise along the line III—III from FIG. 2. As can be seen, the extruder arrangement used here is a twin-screw extruder with the screws 1 and 1', which melt the polymer material fed to them and force it into the cavity 3 of the intermediate plate 4. From the cavity 3, the polymer material is then forced through the passages 22 in the manifold 21, from where the polymer material passes into the passage 18 of the die head 7. Thereafter, the polymer material emerges through the dies 19 in the die plate 12.

For further details on the function of the arrangement according to FIG. 3, reference is made to the explanations for FIGS. 1 and 2.

Figure 4:
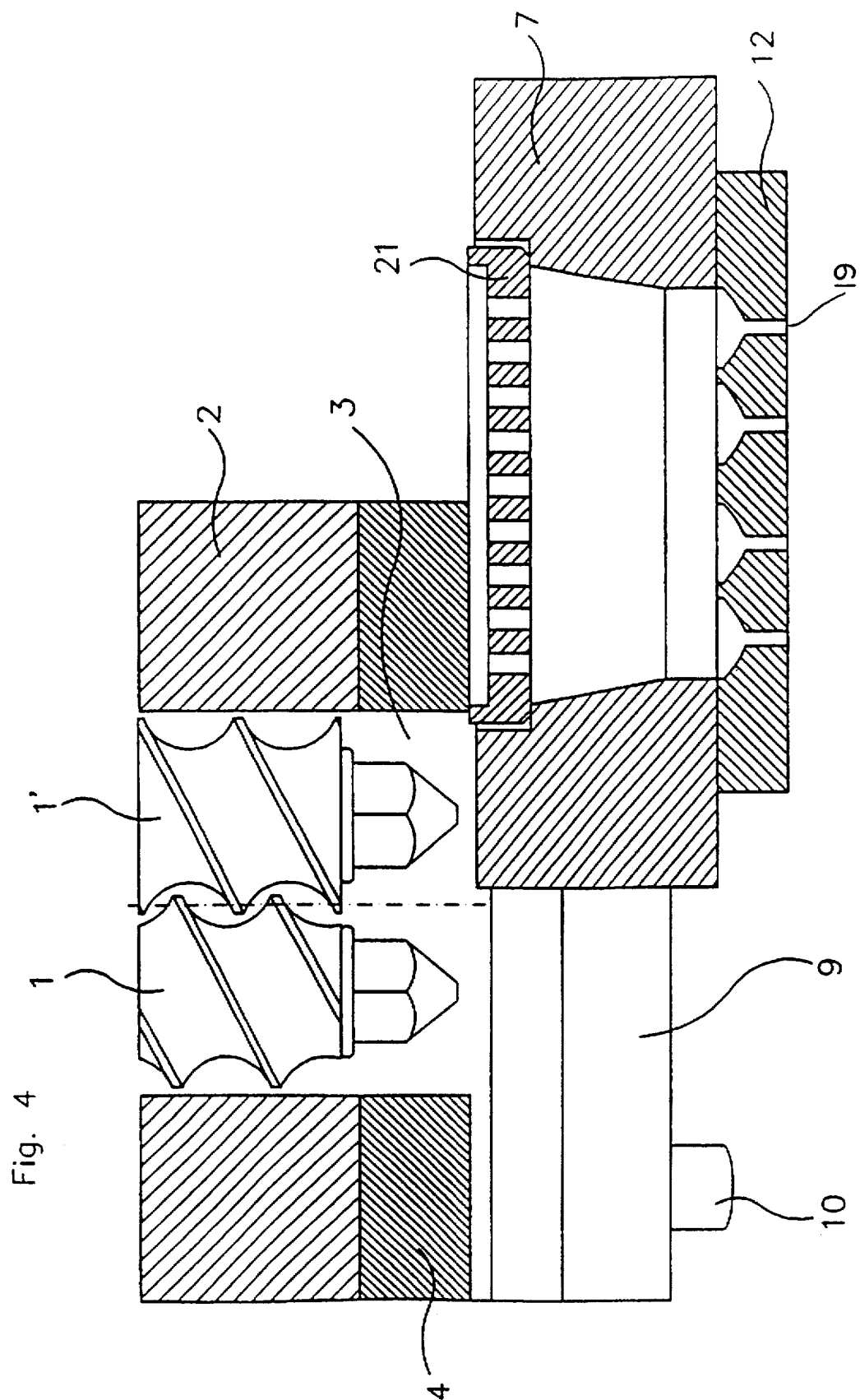
FIG. 4 shows the same arrangement as FIG. 2 with laterally displaced manifold with die head.

In FIG. 4, the arrangement according to FIG. 3 is shown in a displacement position in which the die head 7 with the die plate 12 and the manifold 21 is shown laterally displaced, the die head 7 still being held however by the mounts 9 on the intermediate plate 4. As can be seen, this displacing makes the cavity 3 accessible (although only partially in the position represented in FIG. 4). By further displacing of the die head 7, not shown here, the latter finally arrives in a position in which, because of the end of the mounts 7, it can be removed from the intermediate plate 4 and consequently from the extruder barrel 2.

The same technique for removal of the die head 7 can also be used for the die plate 12, which in this case is pushed out from the projections 16 (see FIGS. 1 and 2).

I claim:

1. A die assembly fitted to the outlet of an extruder for discharging thermoplastics melted in the extruder, flowing through the assembly and being delivered through a die plate of a die head on the outlet side of the die head, wherein the die head is mounted longitudinally displaceably, transversely with respect to the thermoplastic flow, in a rail guide of an intermediate plate arranged between the outlet of the extruder and the die head, and can be removed from the intermediate plate by longitudinal displacing, the die head being supported on the intermediate plate by means of longitudinal flanges extending into longitudinal grooves in the intermediate plate, the grooves being formed by longitudinal grippers forming an outer wall of the intermediate plate, said grippers being penetrated by screws directed to the flanges, the flanges each having one surface abutting a sealing surface of the intermediate plate and an opposite surface engaged by the screws whereby the screws press the flanges against said sealing surface of the intermediate plate and hold thereby the die head in fixed position, the loosening of the screws makes possible the longitudinal displaceability of the die head.

2. The die assembly as claimed in claim 1, wherein the intermediate plate contains a cavity for receiving the melted thermoplastics, the cross section of which plate right up to the die head corresponds at least to the barrel bore of the extruder.

3. The die assembly as claimed in claim 1, wherein the die head (7) is provided with heating cartridges.

4. The die assembly as claimed in claim 1, wherein a manifold is supported by its own sealing surfaces against the intermediate plate and the die head.

* * * * *